June 20, 1967          E. R. BRANDT ETAL          3,326,105
PHOTOGRAPHIC EXPOSURE CONTROL DEVICE
Filed June 4, 1963                                3 Sheets-Sheet 1

INVENTORS
Edison R. Brandt
Bruce K. Johnson
BY
Brown and Mikulka
ATTORNEYS

June 20, 1967  E. R. BRANDT ETAL  3,326,105
PHOTOGRAPHIC EXPOSURE CONTROL DEVICE
Filed June 4, 1963  3 Sheets-Sheet 3

INVENTORS
Edison R. Brandt
BY Bruce R. Johnson
Brown and Mikulka
ATTORNEYS

United States Patent Office 3,326,105
Patented June 20, 1967

3,326,105
PHOTOGRAPHIC EXPOSURE CONTROL DEVICE
Edison R. Brandt, Marblehead, and Bruce K. Johnson, Woburn, Mass., assignors to Polaroid Corporation, Cambridge, Mass., a corporation of Delaware
Filed June 4, 1963, Ser. No. 285,472
7 Claims. (Cl. 95—11.5)

This invention relates to photography and more specifically to exposure control apparatus such as camera shutters.

Included among the various conventional shutter devices are those wherein an opening in a single, opaque shutter blade traverses an exposure aperture to permit the passage of light therethrough for a period of time dependent upon the speed of movement of the blade. Subsequent exposures may be made in the same manner after returning the blade to its initial position. In order to allow light to pass through the exposure aperture and strike the film during the first movement of the blade and to prevent light from striking the film, thus causing a "double exposure," when the opening traverses the exposure aperture during the return movement of the shutter blade, a second opaque blade, movable between covering and uncovering positions with respect to the exposure aperture is provided. The second blade, hereinafter termed the capping blade, is commonly moved by manually engageable means to uncover the exposure aperture and movement may then be imparted to the shutter blade by means of an over-center spring, having one end engaged in the capping blade and the other in the shutter blade. Movement of the capping blade to the uncovering position also moves one end of the spring to such a position that it urges the shutter blade toward exposure movement.

After the shutter blade has moved so that the opening therein has traversed the exposure aperture, the capping blade is returned to its covering position by means such as a conventional return spring. Such return motion of the capping blade again changes the position of the over-center spring so that the shutter blade is urged back to its original position thereby. It is generally desirable, especially when such shutters are incorporated in hand-held cameras, to reduce both the force and the distance of travel required for actuation to a minimum.

It is a principal object of the present invention to provide a photographic exposure control device of the self-cocking type wherein a minimum of energy is required in moving the elements through the exposure and return cycle.

A further object is to provide a photographic shutter of the type wherein a pair of opaque blades are movable relative to an exposure aperture, the blades being coupled by resilient spring means which drive the second blade in response to movement of the first, and the blades are pivotally mounted for rotation about laterally displaced axes.

Another object is to provide a novel construction for a blade-and-cover-blind type photographic shutter which makes possible both a lighter manual actuating force and a shorter travel stroke of the actuating member than is possible in similar devices previously known.

Other objects are: to provide a shutter device having a blade movable to effect an exposure and to return to its initial position in response to movement of an over-center spring which is coupled to the blade, wherein less energy is removed from the spring in returning the blade to its initial position than in moving it to effect an exposure; to provide a shutter device of the type having two pivotally mounted blades which are interconnected by means of an over-center spring which drives one of the blades in response to manual movement of the other, wherein the amount of angular movement of the blade driven by the spring is greater than that of the manually driven blade; to provide a shutter device of the aforementioned type which may be selectively operated at any of a plurality of exposure times; and, to provide such a shutter device having a selection of exposure times wherein the relationship of the amount of light which passes through the exposure aperture for one of the exposure times to that which passes through at another of the exposure times is not the same when the scene is illuminated by ambient light as when it is illuminated by photoflash apparatus.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein.

Figure 1:
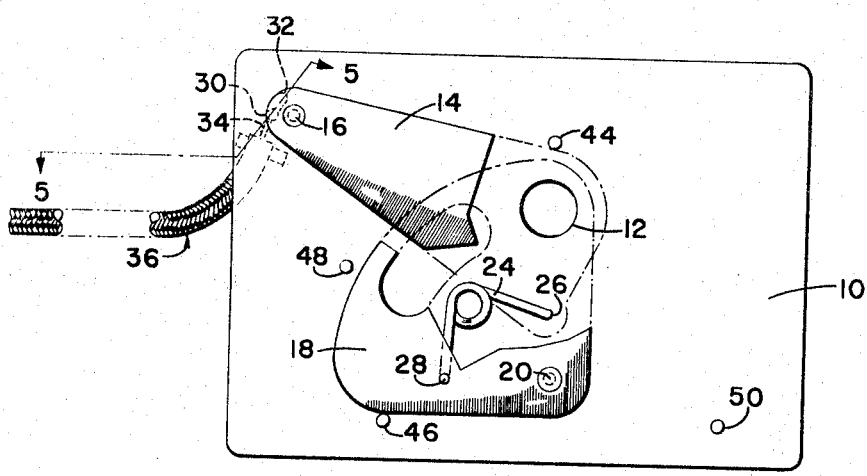
FIGURE 1 is a plan view of a shutter mechanism incorporating the features of a first embodiment of the present invention as seen from the side normally facing the scene to be photographed and showing the elements in a first position.

The elements are mounted upon a support or base 10 which includes exposure aperture 12. Conventional means of various types may be provided, if desired, for varying the effective area of exposure aperture 12, but no such means are shown in connection with the present invention in the interest of brevity and simplicity of disclosure. Capping blade 14 is pivotally mounted, as by pin 16, upon base 10 for movement between covering (FIGS. 1 and 4) and uncovering (FIGS. 2 and 3) positions with respect to exposure aperture 12. Shutter blade 18 is also pivotally mounted upon base 10, by means of pin 20, and includes opening 22 which traverses exposure aperture 12 as shutter blade 18 is moved about its pivotal mounting. Blades 14 and 18 are arranged in overlying relation to one another and are movable about their respective pivotal mountings in substantially parallel planes.

Figure 5:
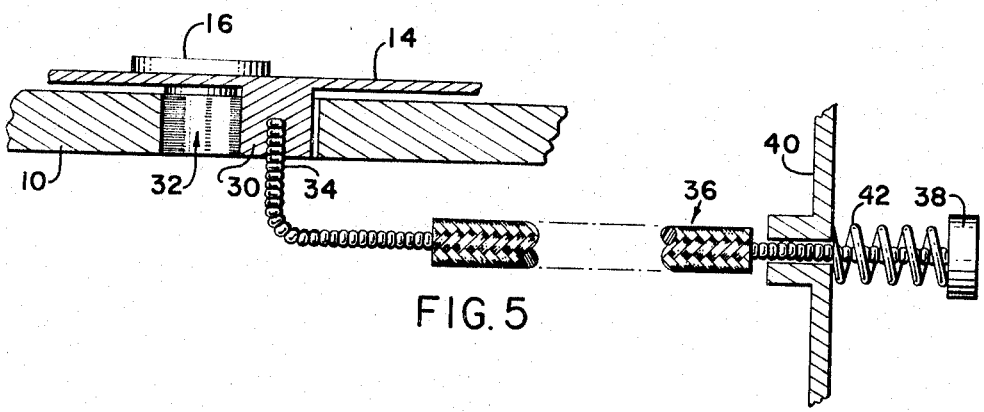
FIG. 5 is a fragmentary, side sectional view taken on the line 5–5 of FIGURE 1.

Capping blade 14 and shutter blade 18 are interconnected by means of over-center spring 24 which is positioned between the blades, having one end 26 fixedly secured to capping blade 14 and the other end 28 fixedly secured to shutter blade 18. Stud 30 is fixedly secured to capping blade 14, or formed as an integral part thereof, and extends through an elongated slot 32 in base 10. As best seen in FIG. 5, wire 34 is affixed at one end to stud 30, as by being inserted in a drilled hole therein. Wire 34 forms a portion of a conventional cable release, designated generally by the reference numeral 36, which terminates in manually engageable shutter release button 38. A convenient and usual means of mounting shutter release button 38 is upon the body of a camera with which the shutter mechanism is associated, a fragment of such camera body being shown in FIG. 5 and indicated by the reference numeral 40. Return spring 42 is provided for urging shutter release button 38 toward the position shown in FIG. 5.

The operation of the shutter mechanism in moving through a complete cycle to effect a photographic exposure will now be explained. Over-center spring 24 is so formed that in the free (or unflexed) position thereof the "arms" which extend on each side of the loop are at a greater angle to one another than in any of the positions shown in the drawings. That is, the spirng is flexed, or bent away from its free position, during the entire cycle of operation of the shutter device. The two ends of the spring, being biased toward the free positions, thus push in opposite directions and the direction of the force exerted thereby on the capping blade and shutter blade may thus be determined. The blades are retained in the position shown in FIGURE 1 by contact of one edge of capping blade 14 with fixed stop 44 and an edge of shutter blade 18 with fixed stop 46 on base 10. In order to initiate movement of the parts to effect an exposure the operator manually depresses shutter release button 38. This results in movement of wire 34 which in turn transmits the motion to stud 30. Capping blade 14 is thus rotated in a counterclockwise direction as seen in FIGS. 1–4 by manual depression of shutter release button 38. End 26 of over-center spring 24 is moved along with the capping blade until the latter uncovers exposure aperture 12 and contacts fixed stop 48 on base 10, thus defining the second position of the capping blade shown in FIG. 2. As the capping blade approaches this position, end 26 of spring 24 crosses the radius from the pivotal mounting of shutter blade 18 through end 28 of the spring. Since the two ends of spring 24 are urged in opposite directions shutter blade 18 is now urged in a clockwise direction by the spring. Thus, as capping blade 14 reaches its second position, shutter blade 18 is moved by the force of spring 24, exerted through end 28 thereof, from its position of FIG. 2 to that of FIG. 3. In so moving, opening 22 in shutter blade 18 moves across exposure aperture 12, allowing light to pass therethrough, thus effecting exposure of a photographic film or the like arranged to receive such light. Movement of shutter blade 18 is arrested in the position of FIG. 3 by stop 50 and spring 24 assumes the position shown in this figure. The movement of shutter blade 18 from its position of FIG. 2 to that of FIG. 3 is hereinafter termed the exposure stroke.

After an exposure has been effected in the above-described manner (the exposure stroke requiring only a fraction of a second in the usual hand-held camera) the operator releases shutter release button 38. Return spring 42 then moves the button back to its original position (FIG. 5), moving wire 34 and capping blade 14 therewith. The return movement of capping blade 14 is halted by contact of the blade with stop 44 and the elements are then in the position shown in FIG. 4. It will be noted that end 26 of spring 24 has again moved past the radius from pin 20 through end 28. A component of the force exerted on shutter blade 18 by end 28 is now in a counterclockwise direction and the shutter blade will thus be returned to its position of FIGURE 1. Since the capping blade is in covering position relative to the exposure aperture, light cannot expose the film as opening 22 traverses the exposure aperture during the movement of the shutter blade from the FIG. 4 to the FIG. 1 position, hereafter termed the return stroke.

As previously mentioned, the rest position of spring 24 is with the arms more nearly linear with respect to one another than in any of the illustrated positions. In order to illustrate more clearly the objects and advantages of the present invention, representative values will be suggested for the angles of the spring arms relative to one another in the various positions shown in the drawings as well as in the free position. It is to be understood that the following table of values is not to be strictly construed but is only one of many in accordance with which the invention may be constructed and employed.

Figure 2:
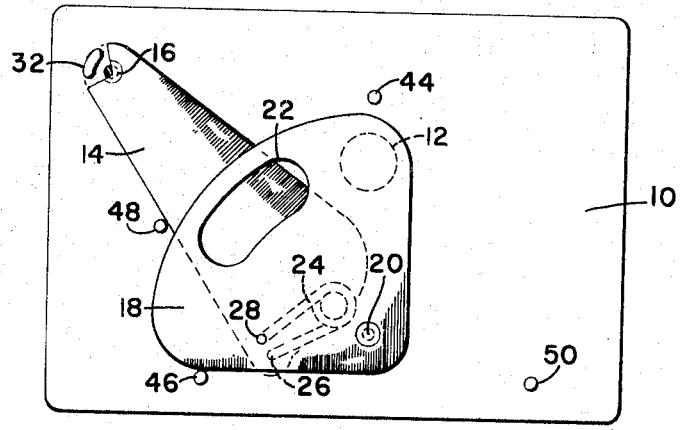
FIGS. 2–4 are also plan views of the shutter mechanism of FIGURE 1, each showing the elements in a different position of the exposure and cocking cycle.
Figure 3:
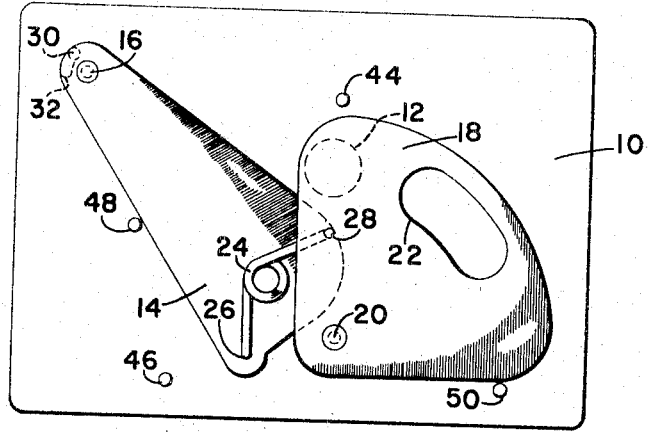
Figure 4:
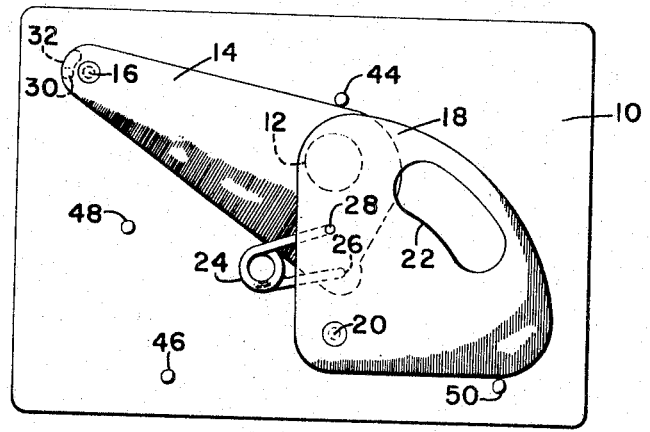

|  | Deg. |
|---|---|
| Free (unflexed) angle | 150 |
| FIG. 1 position | 75 |
| FIG. 2 position | −30 |
| FIG. 3 position | 140 |
| FIG. 4 position | 20 |

The notation −30° is used for the FIG. 2 position of the spring since in moving to this position the angle is decreased to a point where the arms are parallel (0°) and then increased to 30° in the opposite direction. That is, in moving from the position of FIGURE 1 to that of FIG. 2, the arms of spring 24 are moved through 105° (75°+30°) relative to one another.

From a consideration of the above values, the angular deflection of the spring from its free position may be calculated for each of the illustrated positions. These values of deflection are:

|  | Deg. |
|---|---|
| FIG. 1 position | 75 |
| FIG. 2 position | 180 |
| FIG. 3 position | 10 |
| FIG. 4 position | 130 |

The amount of potential energy in a spring such as spring 24 at any given position is expressed as follows: $P.E. = 1/2 K\alpha^2$ where $K$ is the rate of the spring and $\alpha$ is the angular deflection from the free position, usually expressed in either radians or degrees.

The amount of energy removed from, or expended by, spring 24 in moving shutter blade 18 through, for example, the exposure stroke may be calculated by subtracting the potential energy of the spring at the end of such stroke from the potential energy at the beginning. Since the angular deflection of spring 24 at the beginning of the exposure stroke is 180° (FIG. 2) and at the end is 10° (FIG. 3), by applying the above equation the energy removed during the exposure stroke is $$\tfrac{1}{2} K (180°)^2 - \tfrac{1}{2} K (10°)^2$$

or 16,150 K.

The amount of energy removed from spring 24 in moving the shutter blade through the return stroke may be calculated in like manner. The angular deflection of the spring at the beginning of the return stroke is 130° (FIG. 4) and that at the end of the return stroke is 75° (FIGURE 1). Thus, the energy removed is $$\tfrac{1}{2} K (130°)^2 - \tfrac{1}{2} K (75°)^2$$

or 5,638 K. The amount of energy required to move the shutter blade through the return stroke is seen to be roughly 35% of that required to move the shutter blade through the exposure stroke. The total amount of energy removed from the spring in moving the shutter blade through both the exposure and the return strokes is (16,150+5,638) 21,788 K.

It is necessary, of course, to put this amount of energy into the system when shutter release button 38 is depressed. Spring 24 is moved from its position of FIGURE 1 to that of FIG. 2, thus increasing the potential energy of the spring by increasing the angular deflection from the free position of the spring. Also, in return spring 42 is compressed, increasing its potential energy. Disregarding friction, inertia, lost motion, etc., the force required to depress shutter release button 38 is the sum of the force required to move spring 24 from its position of FIGURE 1 to that of FIG. 2, and the force required to compress spring 42. The force which spring 42 must exert when button 38 is released is that force required to move spring 24 from its position of FIG. 3 to that of FIG. 4. using the above values of angular deflection it is found that the force required to move spring 24 from its position of FIGURE 1 to that of FIG. 2 is $\tfrac{1}{2} K (180°^2 - 75°^2)$, or 13,388 K. The force required to move spring 24 from its position of FIG. 3 to that of FIG. 4 is ½K(130°² − 10°²) or 8,400 K. The sum of these two amounts of energy (13,388 + 8,400) is 21,788 K, which was the amount previously calculated as having been removed from spring 24 in moving shutter blade 18 through the exposure and release strokes.

The foregoing examples and calculations have assumed that the arms of spring 24 remained relatively straight as the spring is flexed. That is, a consideration of the angle which the spring arms assume with respect to one another assumes that each arm is substantially linear. Although the illustrative example has been simplified by such an assumption, the operation of the device will not be affected by the fact that one or both of the arms may be bent away from a straight line condition as the spring is flexed. It is preferred, however, that the elastic limit of the spring is not exceeded when it is flexed so that no permanent "set" or deformation results.

Once it has been decided how fast the shutter blade is to move during the exposure stroke, the amount of energy required to move a particular blade through a given distance at this speed may be determined. In the shutter device of the present invention, this is the amount of energy removed from spring 24 as it moves from the position of FIG. 2 to that of FIG. 3. This amount of energy is, therefore, fixed for any given shutter system. If the shutter blade is to be returned to its original position at the same speed as the exposure stroke, the same amount of energy will be required to move the blade from its position of FIG. 4 to that of FIGURE 1. According to the present invention, however, the shutter blade is moved through the return stroke more slowly than it is moved through the exposure stroke. Consequently, less energy is required for the return stroke so that instead of requiring a total energy of twice the fixed amount calculated for the exposure stroke, the total requirement is substantially less. In the specific example suggested hereinbefore, the fixed amount of energy required to move the shutter blade through the exposure stroke at the desired speed was 16,150K. If the shutter blade were moved through the return stroke at the same speed the energy required would also be 16,150K, making the total energy requirement for moving the blade through both the exposure and the return strokes 32,300K. The foregoing calculations have illustrated, however, that the total energy requirement is only 21,788K. This amount of energy is supplied to the system, as previously explained, by manual depression of shutter release button 38. The amount of manual force required is less than that which would be required with a shutter wherein the speed of the return stroke is equal to that of the exposure stroke with resulting advantages previously noted.

Figure 6:
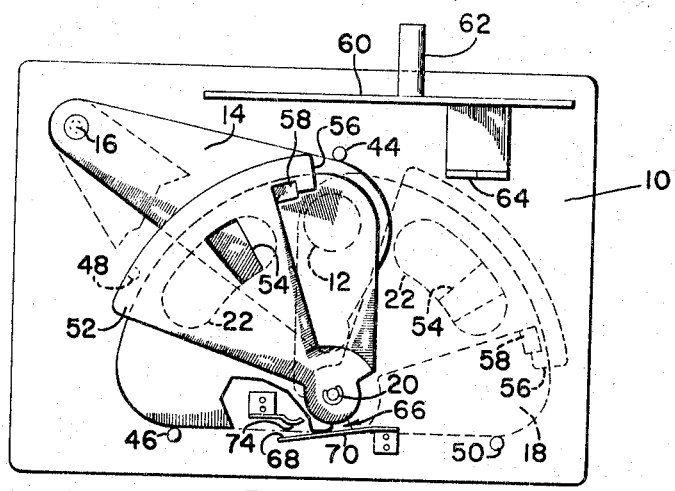
FIGS. 6 and 7 are plan views, as in FIGS. 1–4, of a second embodiment of the invention, showing the elements in a plurality of relative positions.
Figure 7:
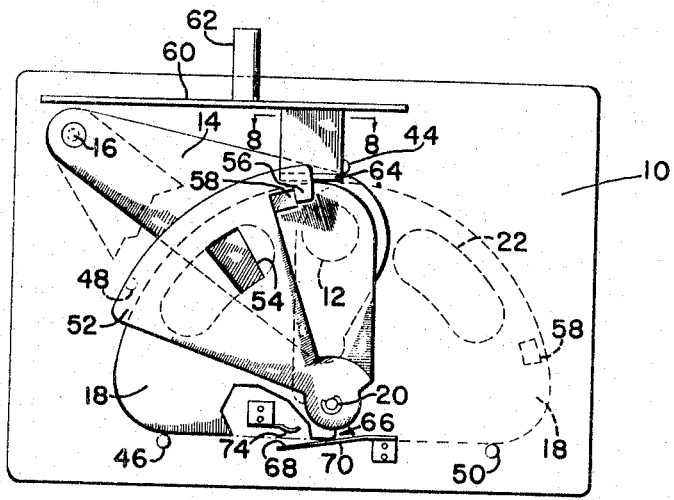
Figure 8:
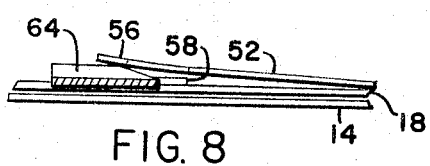
FIG. 8 is a fragmentary, side sectional view taken on the line 8–8 of FIG. 7.

Turning now to FIGS. 6–8, there is illustrated a second embodiment of the invention wherein the operator is provided with a choice of exposure times. Like reference numerals are used for elements which are common to the first embodiment, such elements including, among others, capping blade 14, shutter blade 18, the respective pivotal mountings therefor, and spring 24. In this embodiment an additional blade 52 is provided, being pivotally mounted on the same pin 20 as shutter blade 18. Blade 52 includes opening 54 which is somewhat smaller than, and arranged in overlying relation to, opening 22 in shutter blade 18. Blade 52 includes hooked portion 56 which is selectively engageable with fixed block 58 which extends rigidly from shutter blade 18 in this embodiment.

Slide 60 is mounted for reciprocal sliding movement between the positions of FIGS. 6 and 7 under the control of the operator by engagement of extending portion 62. As best seen in the cross-sectional view of FIG. 8, slide 60 includes cam portion 64. When slide 60 is in the position shown in FIG. 6 hooked portion 56 of blade 52 is engaged with block 58 on shutter blade 18. Since blade 52 is freely rotatable on pin 20 it will travel with shutter blade 18 through the exposure stroke from the position shown in solid lines to that shown in dotted lines in FIG. 6. Likewise, blade 52 will move with the shutter blade through the return stroke to the original position shown in solid lines. Upon movement of slide 60 from the position of FIG. 6 to that of FIG. 7 cam portion 64 moves into engagement with a portion of blade 52, thus moving hooked portion 56 out of engagement with block 58. Blade 52 is preferably formed of a somewhat resilient material, such as relatively thin spring steel, whereby the end which carried hooked portion 56 may be moved as indicated without permanently bending the blade or otherwise deforming it. With slide 60 in the position of FIG. 7 shutter blade 18 may be moved through the exposure and return strokes without moving blade 52. When slide 60 is returned to the position of FIG. 6 the resilience of blade 52, tending to return the blade to its original position, again places hooked portion 56 in engagement with block 58.

It may thus be seen that the embodiment of the shutter shown in FIGS. 6–8 may be operated at either of two "shutter speeds." This is, although shutter blade 18 moves through the exposure stroke at substantially the same rate of travel, exposure aperture 12 will be uncovered to permit passage of light to the film for a longer period when shutter blade 18 is moved independently than when blade 52 is moved therewith. The amount of variation in exposure time between the two methods of operating the shutter will be dependent upon the relationship of the size of opening 54 to that of opening 22. Thus, the amount of light of a given intensity which passes through the exposure aperture to strike the film will vary in the same relationship.

The shutter device of the invention may also be used to advantage in making exposures of a scene illuminated by photoflash apparatus. For this purpose, a conventional flash illumination source (not shown) may be provided to direct light upon the scene being photographed as the shutter opens to allow such light to strike the film. Electrical actuation is normally provided for such photoflash apparatus in synchronization with the movement of the shutter to make an exposure. A pair of electrical contacts comprising a portion of the flash synchronizing circuit may conveniently be provided in such position as to be closed, thus closing the circuit supplying electrical power to the flash source, by movement of the shutter elements.

Figure 9:
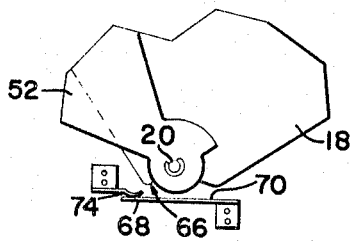
FIG. 9 is a fragmentary view of a portion of the device of FIGS. 6 and 7, showing selected elements in an intermediate position of their movement.

Such an arrangement is shown in part in connection with the second illustrated embodiment of the invention (FIGS. 6, 7 and 9) although it will be readily understood that the first embodiment may also be so constructed. It will be noted that a portion of the peripheries of shutter blade 18 and blade 52 have been removed to form an irregular outline in the area denoted by the reference numeral 66. Movable contact 68, on the end of spring arm 70, is connected in an appropriate manner into the flash synchronizing circuit of the shutter. Stationary contact 74 is anchored to base portion 10 and electrically connected into the flash synchronizing circuit in such a way that a flash bulb, or other such lighting source, will be actuated by closure of contacts 68 and 74. As best seen in FIG. 6, when shutter blade 18 is in its first position, spring arm 70 contacts an edge of the shutter blade and is thereby held apart from stationary contact 74 which is positioned under the blade as shown by the broken-away fragment of the blade. As shutter blade 18 begins to move through the exposure stroke contact 68 is allowed to move, due to the bias of spring arm 70, into cut-out portion 66 of the shutter blade, thus engaging stationary contact 74 and actuating the illuminating source. When shutter blade 18 is returned to its first position, spring arm 70 is again contacted by the edge of the blade and moved away from contact 74.

As previously mentioned, the relationship of the amount of light of a given intensity which passes through exposure aperture 12 during the exposure stroke when shutter blade 18 moves independently to that which passes through the aperture when blade 52 moves with the shutter blade is dependent upon the relationship between the dimensions of openings 22 and 54. For example, if opening 54 is one-fourth as wide as opening 22 then exposure aperture 12 will be uncovered to permit the passage of light to the film for substantially one-fourth as long when blade 52 moves with the shutter blade. Therefore, if two exposures are made, one with shutter blade 18 moving independently and the other with blade 52 moving therewith, at the same light level and with the same exposure aperture size, there will be a difference of two "stops" between the exposures according to normal photographic convention.

When photoflash apparatus is used to illuminate the scene being photographed the light level changes substantially while the exposure is being made. The relationship between the amount of light which passes through the exposure aperture when it is traversed by opening 22 and that which passes through the aperture when it is traversed by opening 54 is not necessarily the same when the light level changes during exposure as when it is constant. Normally the exposure time when opening 22 is used will be substantially greater than the illumination time of a conventional flash bulb. If the uncovering of the exposure aperture by opening 54 is properly synchronized with actuation of the flash bulb, the aperture may be uncovered during the time of peak illumination. Therefore, the amount of light which is allowed to enter and expose the film may be more than one-fourth of that which will enter when opening 22 is used since the light intensity is higher during the time that the aperture is uncovered by opening 54 than during the majority of the time it is uncovered by opening 22. For example, by traversing the exposure aperture by opening 54 when the light output from the photoflash source is at its brightest, half of the useful light may be used to effect exposure. In such case there would be a one stop difference between the exposures effected by openings 22 and 54 when the scene is illuminated by photoflash apparatus rather than the two stop difference which results when the intensity of scene light is constant.

It is also to be noted that with the relative mountings of capping blade 14, shutter blade 18 and over-center spring 24, in both embodiments of the invention the shutter blade is driven through an angular movement of substantially 90° in each direction by an angular movement of approximately 20° of the capping blade. The length of the stroke or travel of the shutter release button depends upon the amount of angular movement required to move the capping blade to the uncovering position and the length of the moment arm used; that is, the distance from the capping blade pivot to the point thereon at which the force is applied. As previously mentioned, it is desirable to have both a short stroke and a light manual force required for the shutter release button. In the present invention the relatively small amount of angular movement required for the capping blade permits a shorter travel stroke for the shutter release button for a given moment arm. Alternatively, if the same length of release button travel is used to move the capping blade through 20° as would be used to move it through a greater angle, the moment arm may be lengthened. This results in a more linear motion at the point at which force is applied, and less effective from backlash or lost motion in the capping blade pivot.

It is thus seen that the photographic shutter or exposure control device of the present invention provides many desirable and improved features in a shutter of this type. The arrangement of the blades and the driving spring allow the shutter blade to be returned to its initial position with the expenditure of less energy than is required to move the blade through the exposure stroke. This results in a smaller total energy requirement and thus a lighter force on the manual release means. Also, the relatively small amount of angular movement required for the capping blade results in further mechanical advantages by allowing a more nearly linear motion of the release means and in reducing the effect of backlash on the length of release button stroke. An alternate embodiment is also shown wherein a selection of exposure times is provided with even further advantages.

Since certain changes may be made in the above apparatus without department from the scope of the invention herein involved, it is intended that all matter contained in the above description or shown in the accompanying drawings shall be interpreted as illustrative and not in a limiting sense.

What is claimed is:
1. A photographic exposure control device comprising, in combination:
 (a) means defining an exposure aperture;
 (b) a first opaque blade movable with respect to said aperture and having therein a first opening so arranged with respect to said aperture and the path of movement of said first blade that said first opening traverses said aperture during movement of said first blade, thereby unblocking said aperture to permit passage of light therethrough for a first time interval;
 (c) a second opaque blade movable with respect to said aperture and having therein a second opening so arranged with respect to said aperture and the path of movement of said second blade that said second opening traverses said aperture during movement of said second blade, thereby unblocking said aperture to permit passage of light therethrough for a second time interval;
 (d) selector means movable between first and second positions determinative of the one of said first and second openings by which said exposure aperture is unblocked as said blades are moved;
 (e) said first and second blades being movable at substantially the same speed and said first and second openings being of different dimensions with respect to the direction of traversal of said aperture, whereby said first and second time intervals are of different durations;
 (f) a flash synchronizing circuit including means adapted to actuate a photoflash lighting source in response to movement of either of said first and second blades; and
 (g) means for so synchronizing the light output of said lighting source with said first and second time intervals that the difference between the amount of light passing through said aperture during said first time interval and that amount passing through during said second time interval is not the same when the scene being photographed is illuminated by ambient light as when it is illuminated by said photoflash lighting source.

2. A photographic exposure control device according to claim 1 wherein said second blade may be moved by releasably coupling it to said first blade for movement therewith and with a portion of said second blade and said second opening in overlying relation to said first opening.

3. A photographic exposure control device according to claim 2 and including a capping blade, means for moving said capping blade between covering and uncovering positions with respect to said aperture, and an over-center spring providing a resilient coupling between said capping blade and said first blade, whereby said first blade is moved in response to movement of said capping blade to said covering and uncovering positions.

4. A photographic exposure control device according to claim 2 wherein said second opening overlies said first opening in a centrally-disposed portion thereof with respect to the direction of travel of said blades.

5. A photographic exposure control device comprising, in combination:
(a) means defining an exposure aperture;
(b) shutter means movable between blocking and unblocking positions with respect to said aperture to permit passage of light therethrough for a predetermined exposure period;
(c) selecting means operable to vary said exposure period between first and second intervals of different duration, whereby the amount of light passing through said aperture during said first interval constitutes a predetermined multiple of the amount passing through said aperture during said second interval;
(d) a flash synchronizing circuit including means adapted to actuate a photoflash lighting source in response to movement of said shutter means to said unblocking position; and
(e) means for so synchronizing initiation and termination of said first and second intervals with the intensity of light output from said photoflash source that said predetermined multiple is different when the scene light is provided by said photoflash source than when it is of constant intensity.

6. A photographic exposure control device according to claim 5 wherein said second interval is substantially shorter than said first interval and said synchronizing means are so constructed that said second interval occurs during the time the intensity from said photoflash source is the highest.

7. A photographic exposure control device according to claim 6 wherein said shutter means includes first and second blades movable with respect to said exposure aperture, and said selecting means includes a portion cooperable with said blades and manually movable between a first position, wherein said first blade is movable to unblock said aperture for said first exposure interval, and a second position, wherein said second blade is movable to unblock said aperture for said second exposure interval.

References Cited

UNITED STATES PATENTS

| | | | |
|---|---|---|---|
| 2,053,513 | 9/1936 | Blattner | 95—60 |
| 2,238,491 | 4/1941 | Hutchison | 95—60 |
| 2,663,233 | 12/1953 | Rentschler | 95—11.5 |
| 2,690,105 | 9/1954 | Lawson | 95—11.5 |
| 2,718,834 | 9/1955 | Fuerst | 95—60 |
| 2,933,025 | 4/1960 | Meyer | 95—11.5 |

JOHN M. HORAN, *Primary Examiner.*

NORTON ANSHER, *Examiner.*

J. R. BLOOM, *Examiner.*